(12) United States Patent
Zutler et al.

(10) Patent No.: US 12,251,971 B2
(45) Date of Patent: Mar. 18, 2025

(54) TRAILER SUPPORT SAFETY STAND

(71) Applicant: GLOBAL INDUSTRIAL DISTRIBUTION INC., Port Washington, NY (US)

(72) Inventors: Bruce B. Zutler, Port Washington, NY (US); Harry E. Wellington, Port Washington, NY (US); Daniel P. Doodnauth, Port Washington, NY (US); James T. Sloat, Port Washington, NY (US); Christopher S. Quilla, Port Washington, NY (US)

(73) Assignee: GLOBAL INDUSTRIAL DISTRIBUTION INC., Port Washington, NY (US)

( * ) Notice: Subject to any disclaimer, the term of this patent is extended or adjusted under 35 U.S.C. 154(b) by 344 days.

(21) Appl. No.: 17/732,178

(22) Filed: Apr. 28, 2022

(65) Prior Publication Data
US 2023/0347698 A1 Nov. 2, 2023

(51) Int. Cl.
*B60D 1/00* (2006.01)
*B60D 1/66* (2006.01)

(52) U.S. Cl.
CPC .................................. *B60D 1/665* (2013.01)

(58) Field of Classification Search
None
See application file for complete search history.

(56) References Cited

U.S. PATENT DOCUMENTS

| | | | | |
|---|---|---|---|---|
| 3,355,136 A | * | 11/1967 | Staples | F16M 11/046 248/352 |
| 7,581,713 B1 | * | 9/2009 | Voss | B66F 3/25 254/2 B |
| 8,016,257 B2 | | 9/2011 | Di Biase | |
| 9,327,781 B2 | * | 5/2016 | Hopkins | B62D 53/0857 |
| 9,494,275 B2 | * | 11/2016 | Crump | B60T 3/00 |
| 11,225,225 B2 | * | 1/2022 | Di Biase | B66F 5/025 |

* cited by examiner

*Primary Examiner* — Steven M Marsh
(74) *Attorney, Agent, or Firm* — TROUTMAN PEPPER LOCKE LLP (57) ABSTRACT

A trailer support safety stand may include a top plate, a base pad, a post assembly including first and second posts, and a height adjustment mechanism including a handle, a locking device, and a linkage providing a pivot point between the handle and locking device. The first post may include first opening(s) and the second post may include a second opening. The first and second posts may telescope within each other such that the first and second opening(s) can align. The height adjustment mechanism may adjust a height of the post assembly such that when the handle is rotated around the pivot point and toward the post assembly, the locking device may be inserted through the aligned first and second openings, and when the handle is rotated around the pivot point and away from the post assembly, the locking device may be removed from the aligned first and second openings.

20 Claims, 9 Drawing Sheets

TRAILER SUPPORT SAFETY STAND

FIELD

The present invention relates to a trailer support safety stand with enhanced operability.

BACKGROUND

Landing gear for articulated trailers allows the raising, lowering, and support of the forward end of the trailer in the engagement and disengagement from the prime mover (alternatively known as the tractor or truck) and allows the trailer to be freestanding while not in transit. In most instances, the trailer itself is decoupled from a prime mover and then re-coupled to either the same prime mover or another depending on the logistics appropriate to the use.

A typical scenario is where a trailer is delivered to a loading dock for loading or unloading. The trailer will typically be loaded up to twenty tons in weight, and in some instances up to twenty-five tons. The prime mover positions the trailer in the loading dock. The operator will de-latch the kingpin from the turntable (alternatively known as the fifth wheel) and disconnect the service lines. The operator will then manually lower the legs of the landing gear. The operator will then raise the forward end of the trailer to clear the trailer kingpin from the turntable of the prime mover. Once the trailer kingpin is clear of the prime mover turntable, the prime mover can be driven clear of the trailer to leave the trailer freestanding. The prime mover is then typically utilized elsewhere in a more productive role than being idle while the trailer is loaded or unloaded. The trailer will then be loaded or unloaded which may take any amount of time. Once the trailer is loaded or unloaded, a prime mover will then return to the trailer for the removal from the loading dock.

Under certain conditions of loading and unloading, there is a potential for trailer nose or tail diving. Seldom used or rusted landing gear may collapse under extreme weight conditions. When fork-trucks load or unload at the front of trailers, the trailer can become nose heavy and tip over. An unsupported spotted trailer can collapse with the fork truck and driver inside, creating a hazardous situation. Trailer tip over caused by rusted or faulty landing gear can be very costly with injuries to employees, downtime, and loss of product.

Currently, devices known as "trailer jacks" or "trailer stands" are often used to act as a safety support under the front end of a trailer when it is being loaded or unloaded with the trailer resting on its support legs rather than on a tractor fifth wheel or converter dolly. Many of these known devices use exposed mechanical devices to adjust the height of the support, such as cranks and gears that must be ratcheted or cranked up and down. These known devices may fail due to corrosion and friction between gears causing wear. Other devices use hydraulic or pneumatic devices to adjust the height of the support. One such device is the AUTO-RISER™ trailer stand from TMI Inc. which uses a gas activated leveling system and a security locking pin. The AUTO-RISER™ trailer stand requires the operator to bend over or to squat down to insert and remove the security locking pin, the act of which may result in injury to the operator.

In view of the wide use of trailer loading and unloading practices, and the risks of product failure, operator injury, and process downtime, a need exists for an improved trailer support safety stand with enhanced operability. Embodiments of the present disclosure are directed to this and other considerations.

SUMMARY

A trailer support safety stand is disclosed. In accordance with certain embodiments of the disclosed invention, a trailer support safety stand may be used for supporting a detached trailer portion of a semi-trailer or the like. The stand may include a top plate configured to engage the detached trailer portion (e.g., the underside of the nose portion), and a base pad opposite the top plate and configured to engage the ground. The stand may further include a post assembly, which itself may include a first post and a second post. The first post may extend upwardly from the base pad, and may include one or more first openings. The second post may extend downwardly from the top plate, and may include a second opening. The first and second posts may be configured to telescope within each other such that the one or more first openings can align with the second opening. The stand may further include a height adjustment mechanism, which itself may include a handle and a locking device disposed at an end of the handle. The height adjustment mechanism may be configured to adjust a height of the post assembly such that when the handle is moved toward the post assembly, the locking device may be inserted through the aligned first and second openings, and when the handle is moved away from the post assembly, the locking device may be removed from the aligned first and second openings.

In some embodiments, the height adjustment mechanism may further include a piston (e.g., internal to the stand) to aid in adjusting the height of the post assembly.

In some embodiments, the height adjustment mechanism may further include a linkage configured to provide a pivot point between the handle and the locking device. In such embodiments, moving the handle toward and away from the post assembly may involve pivoting the handle around the pivot point. In other embodiments, moving the handle toward and away from the post assembly may involve moving the handle and the locking device in the same direction.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Figure 1:
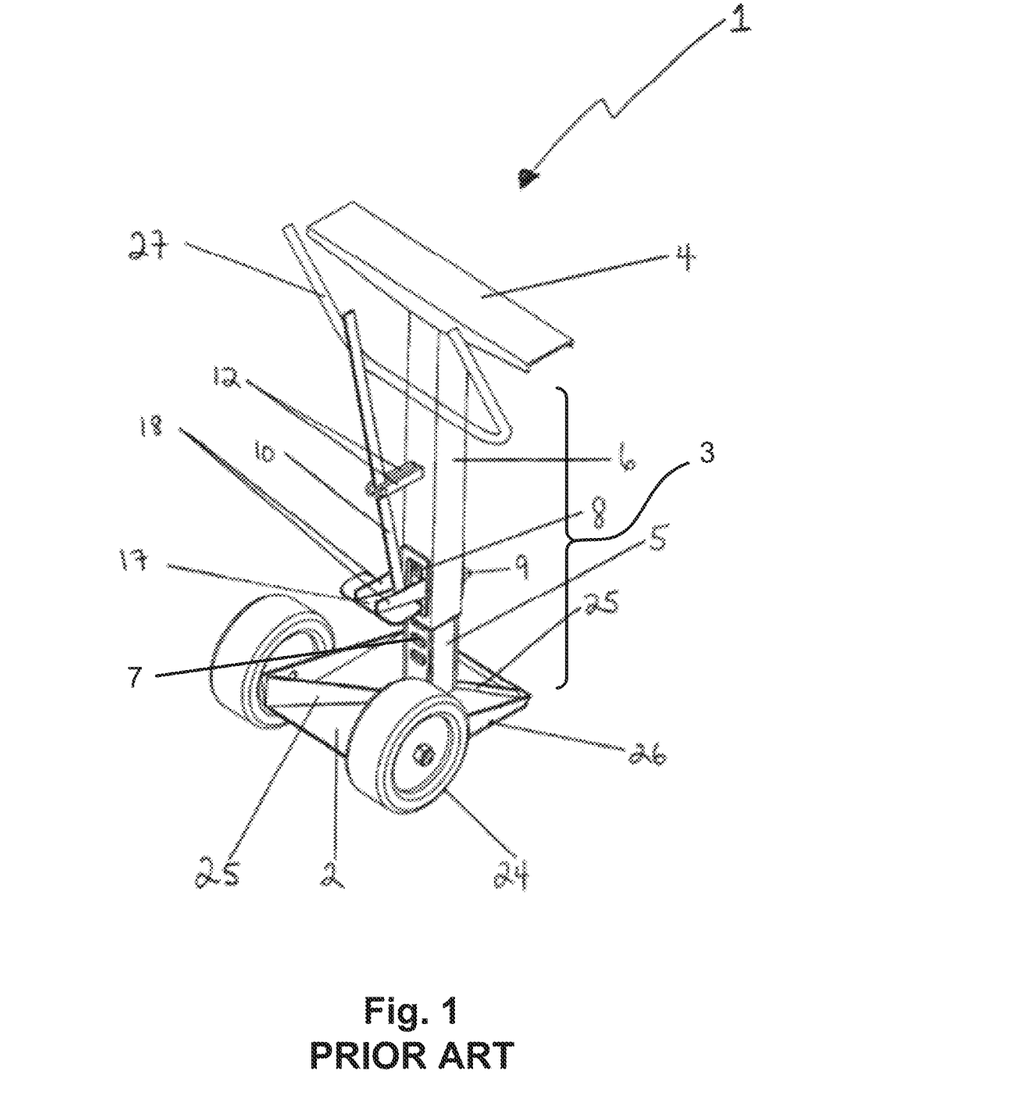
FIG. 1 is a perspective view of an exemplary trailer support safety stand.
Figure 2:
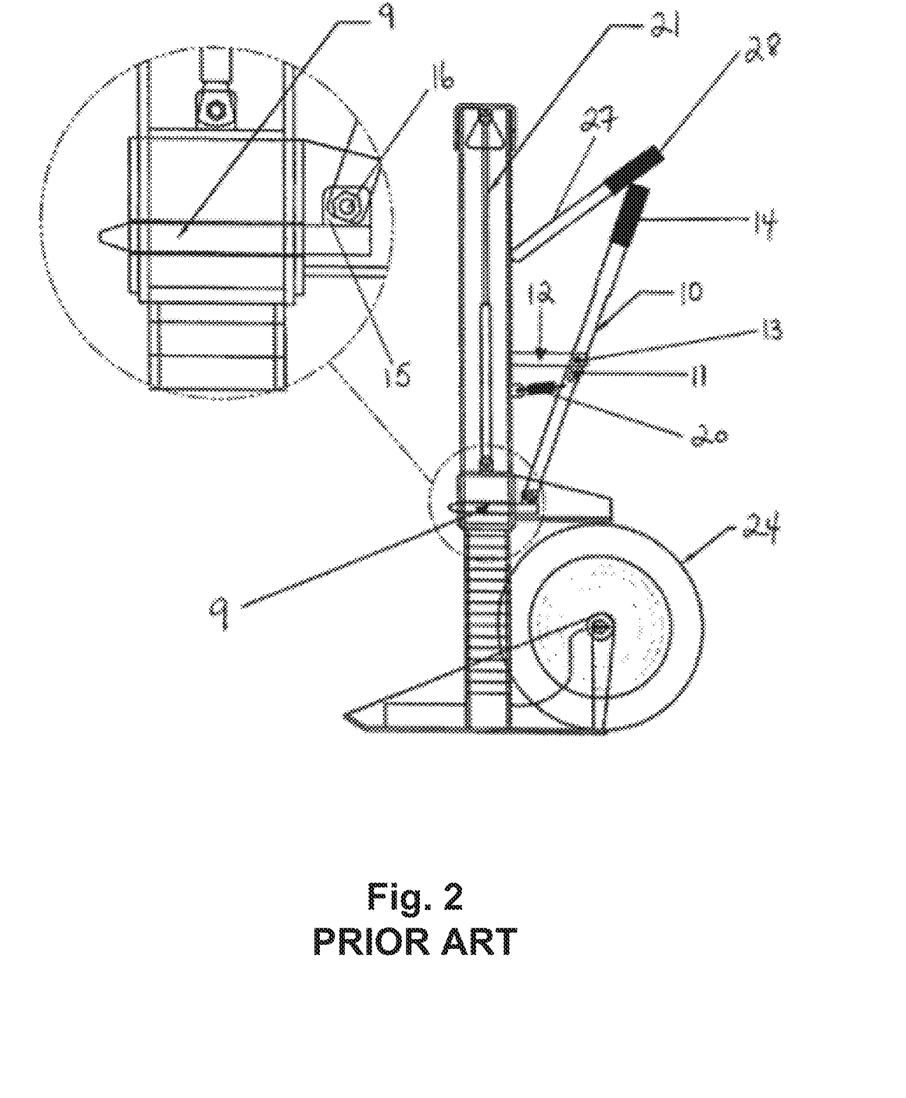
FIG. 2 is a perspective view of an exemplary trailer support safety stand with an exploded view of a locking device.

The present subject matter may be more fully appreciated with reference to an exemplary trailer support safety stand as found in the prior art and depicted in FIGS. 1-2. The trailer safety support stand 1 comprises a base pad 2 for engaging a surface. The base pad is of sufficient area and shape to support the load. In most instances the use location will have a solid or hard packed surface, suitable for vehicular traffic. The area of the base pad is defined by the length of base width and the length of base depth. The combination of base width and base depth are sufficient to provide an adequate area for supporting the load without the stand sinking into the surface.

A post assembly 3, having a lower end and an upper end, extends upwardly from the base pad to a top plate 4 running perpendicular to the post assembly for receiving the underside of the nose portion of a trailer. The lower end of the post assembly is secured (e.g., by welding) to the base pad to restrict motion between the post assembly and the base pad while the load is applied. The upper end of the post assembly is secured (e.g., by welding) to the top plate to restrict motion between the post assembly and the top plate while the load is applied.

The post assembly consists of a lower post 5 extending upwardly from the base pad and an upper post 6 extending downwardly from the top plate. The lower post is a tubular member having a square cross-sectional shape. The upper post is a hollow tubular member having a square cross-sectional shape and having slightly larger dimensions than those of the lower post such that it is configured to slidingly accept the lower post therein providing a telescoping arrangement between the two.

The lower post comprises a plurality of apertures 7 disposed along the length thereof arranged in a vertically spaced apart relationship that are formed in the front of the lower post and extend through the back of the lower post. The lower post apertures have a rounded rectangular shape. The upper post comprises a single aperture 8 formed in the front of the upper post and extending through the back of the upper post. The upper post aperture optionally aligns with the plurality of lower post apertures for fixing the vertical position of the upper post relative to the lower post by a locking device. The upper post aperture has a rounded rectangular shape and is of a size such that, when aligned with the plurality of lower post apertures, it is simultaneously aligned with two vertically adjacent lower post apertures.

As depicted in greater detail in FIG. 2, the trailer support safety stand comprises a locking device, locking pin 9, having slightly smaller dimensions than those of the lower post apertures such that the locking pin is insertable through the aligned upper and lower post apertures to fix the vertical position of the upper post relative to the lower post.

The trailer support safety stand is configured to actuate the locking device such that in a first position, the locking device is engaged with the post assembly, thus securing the height of the post assembly, and in a second position, the locking device is disengaged from the post assembly, thus allowing adjustment of the height of the post assembly. The locking device is actuated by a vertically arranged lever 10 connected at the bottom end thereof to the locking pin and pivotally connected to the upper post at a predetermined distance along the lever up from the locking pin such that when the top end of the lever is moved toward the upper post, the locking pin is removed from the aligned upper and lower post apertures, and when the top end of the lever is moved away from the upper post, the locking pin is inserted through the aligned upper and lower post apertures. The lever is a flat bar having an aperture 11 therein, and the pivotal connection between the lever and the upper post consists of two side members 12 extending out from the upper post to either side of the lever at the location of the aperture and a fastener 13 (e.g., a bolt) running through the side members and the aperture for pivoting therein. The lever may have a grip 14 at the top end thereof for the operator's hand(s).

As particularly shown in the exploded view of the locking device in FIG. 2, the lever may be pivotally connected to the locking pin. The pivotal connection between the lever and the locking pin consists of the bottom end of the lever being attached to a flange 15 on the back end of the locking pin via a fastener 16 (e.g., a bolt).

The trailer support safety stand may be configured to guide the locking pin into and out of the aligned upper and lower post apertures. Turning back to FIG. 1, the stand comprises a floor 17 extending out from, and perpendicular to, the upper post at a position that is level with the bottom edge of the upper post aperture; and two side walls 18 extending up from, and perpendicular to, the floor and arranged in a substantially parallel spaced apart relationship. The two side walls are spaced apart at a distance slightly larger than the width of the locking pin. The floor 17 may be secured to the upper post; and the two side walls may be secured to the floor and the upper post. The width of the floor 17 may be greater than the distance between the two side walls such that the floor on the outside forms a foot pedal for the operator to allow the operator to control both the direction in which the upper post moves relative to the lower post and the speed of the movement.

In the operation of the trailer support safety stand 1, the operator places his/her foot on the foot bar, grabs the double positioning handles 27 and tilts the stand toward himself/herself off of the base pad and onto its wheels 24, removes his/her foot from the foot bar, wheels the stand into the proper supporting position relative to the nose portion of a trailer, places his/her foot back on the foot bar, and tilts the stand back onto its base pad. The stand is positioned so that the top plate will engage the underside of the nose portion of the trailer when the stand is raised. The operator places his/her foot on the foot pedal and applies a downward force thus taking advantage of the allowance for the downward telescopic movement of the upper post relative to the lower post, thus making it easier for the locking pin to be disengaged from the post assembly. While applying the downward force, the top of the lever is pushed toward the upper post thus moving the bottom of the lever away from the upper post and causing the locking pin to be removed from the aligned upper and lower post apertures. Accordingly, the locking pin is disengaged from the post assembly. This allows the operator to raise the upper post to the desired position such that the top plate engages or is positioned just below the underside of the nose portion of the trailer. The operator controls the direction and speed of the movement of the upper post relative to the lower post with his/her foot on the foot pedal. When the stand has been raised to the desired position, the top of the lever is then pulled away from the upper post thus moving the bottom of the lever toward the upper post and causing the locking pin to be inserted through the aligned upper and lower post apertures. Accordingly, the locking pin is engaged with the post assembly and the upper post is locked against movement in either vertical direction relative to the lower post. If desired, the trailer landing gear may then be lowered to further enhance the stability of the trailer.

Reference will now be made in detail to exemplary embodiments of the disclosed technology, examples of which are illustrated in FIGS. 3A-3E, 4A-4B, 5A-5B, and 6A-6F, and disclosed herein. Wherever convenient, the same reference numbers will be used throughout the drawings to refer to the same or like parts.

FIGS. 3A-3E, 4A-4B, 5A-5B, and 6A-6F depict an embodiment of a trailer support safety stand in accordance with the present invention. The trailer support safety stand 100 may be used for supporting a detached trailer portion of a semi-trailer or the like. The stand 100 may include a top plate 102 configured to engage the detached trailer portion (e.g., the underside of the nose portion), and a base pad 104 opposite the top plate 102 and configured to engage the ground. In some embodiments, as particularly shown in FIGS. 3C-3D, the base pad 104 may comprise one or more stiffening brackets 105 configured to provide additional structural support for base pad 104 and stand 100. In some embodiments, stiffening brackets 105 may be configured to be parallel with base pad 104 (105*a*) and/or perpendicular to base pad 104 (105*b*).

In some embodiments, base pad 104 may further comprise one or more wing supports 104*a*, as particularly shown in FIG. 3C, configured to support one or more wheels 132, as particularly shown in FIGS. 3A-3B and 3D, and as further described below. As particularly shown in FIGS. 3C-3D, the wing supports 104*a* may each comprise an opening 104*b* through which an axel A1, connected to a wheel 132, may be fastened (e.g., via a hex nut). Openings 104*b* may comprise a diameter of approximately 1.06 inches. Wing supports 104*a* may comprise a height of approximately 8.75 inches measured from the top or upper surface of base pad 104 to the center of opening 104*b*, or approximately 10.25 inches measured from the top, or highest point, of wing supports 104*a* to the ground. Two wing supports 104*a* may be configured on opposite sides of base pad 104 and may be configured approximately 17.0 inches apart.

Figure 5A:
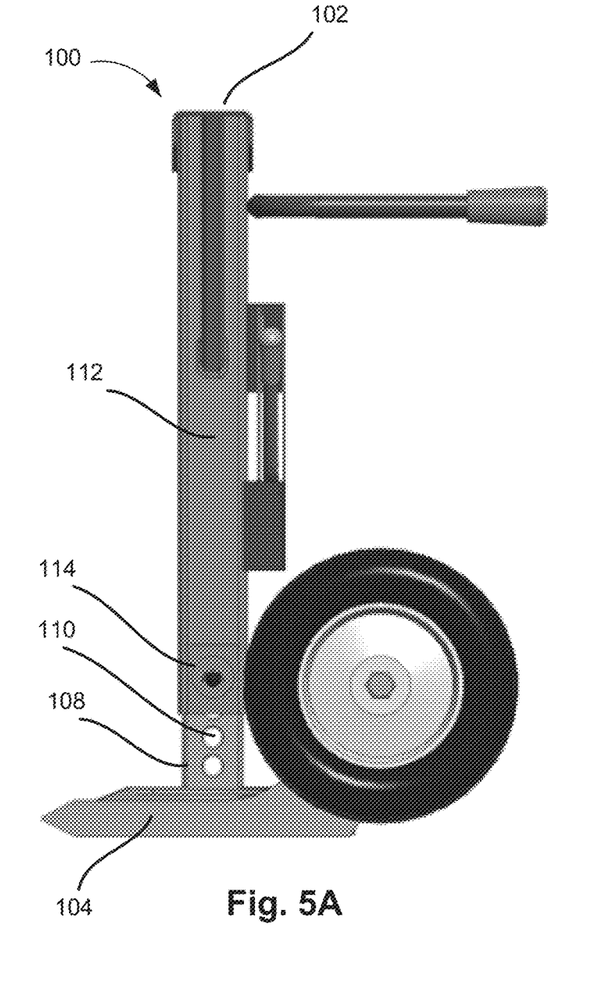
FIG. 5A is a right side view of a trailer support safety stand in an unlocked position according to certain embodiments of the present disclosure.
Figure 5B:
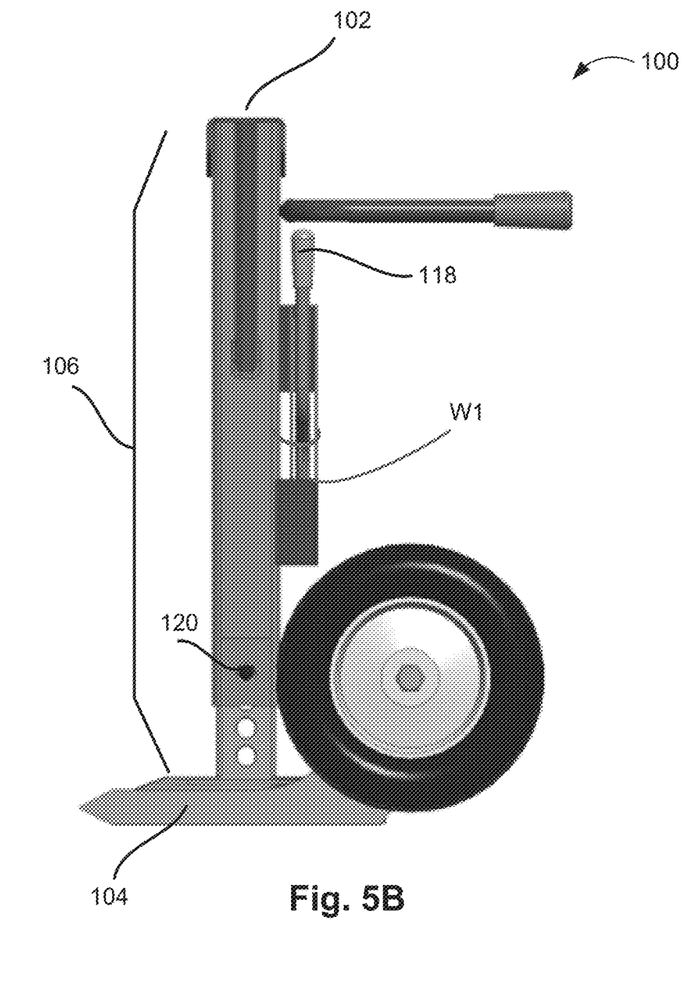
FIG. 5B is a right side view of a trailer support safety stand in a locked position according to certain embodiments of the present disclosure.

As particularly shown in FIGS. 5A-5B, the stand 100 may further include a post assembly 106, which itself may include a first post 108 and a second post 112. The first post 108 may extend upwardly from the base pad 104, while the second post 112 may extend downwardly from the top plate 102. The top plate 102 may comprise a fastener, for example, a gas spring mounting bracket B1, as particularly shown in FIG. 6A, configured to attach to a mechanism internal to post assembly 106, e.g., a piston or gas spring, used for adjusting the height of post assembly 106, as further discussed below. In some embodiments, bracket B1 may be positioned in the center of the top plate 102. For example, if the top plate 102 is approximately 28.76 inches in length and approximately 4.62 inches in width, bracket B1, or other fastener, may be positioned approximately 14.38 inches along the length of top plate 102 and approximately 2.31 inches along the width of top plate 102. In some embodiments, bracket B1 may comprise openings B2 that extend through opposing walls of bracket B1. Openings B2 may be circular in shape and approximately 0.44 inches in diameter. Bracket B1 may further comprise a bottom plate P, approximately 0.5 inches thick, and approximately 2.0 inches in length by 3.14 inches in width.

Turning back to FIGS. 5A-5B, in some embodiments, the first post 108 may be approximately 30.0 inches in height, while the second post 112 may be approximately 35.0 inches in height. The first post 108 and the second post 112 may be configured to telescope within each other such that the height of post assembly 106 may be adjusted, as further described below. That is, as particularly shown in FIGS. 6B and 6C, first post 108 may comprise a hollow tubular member having a square cross-sectional shape, while second post 112 may comprise a hollow tubular member also having a square cross-sectional shape, but with slightly larger dimensions than those of first post 108. Such configuration provides that second post 112 may slidingly accept first post 108 as the height of post assembly 106 is adjusted, as further described below. For example, first post 108 may have an external cross-sectional area of approximately 3.53 inches by 3.53 inches, while second post 112 may have an internal cross-sectional area of approximately 3.69 inches by 3.69 inches.

Figure 4A:
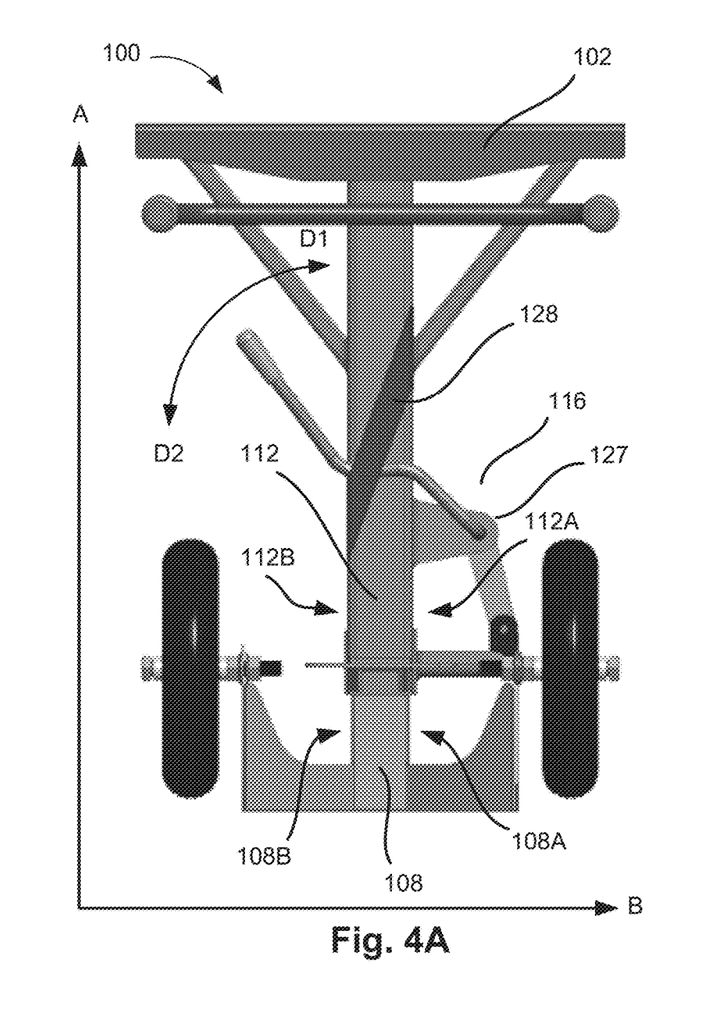
FIG. 4A is a rear view of a trailer support safety stand in an unlocked position according to certain embodiments of the present disclosure.
Figure 6A:
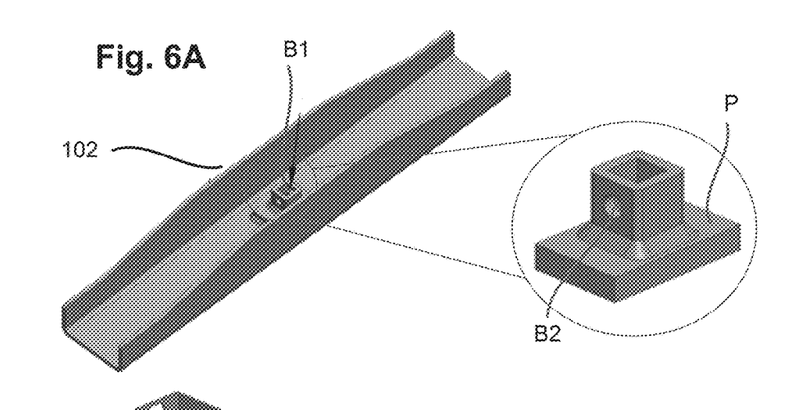
FIG. 6A is a perspective view of a top plate of a trailer support safety stand according to certain embodiments of the present disclosure.
Figure 6B:
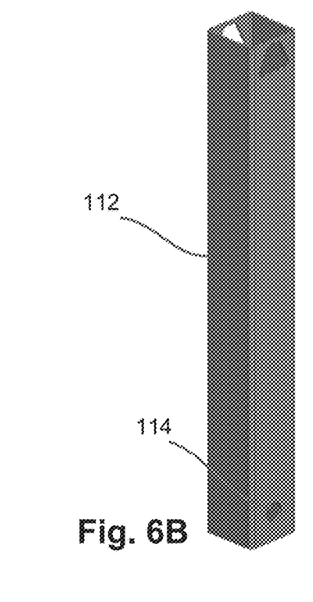
FIG. 6B is a perspective view of a second post of a trailer support safety stand according to certain embodiments of the present disclosure.
Figure 6C:
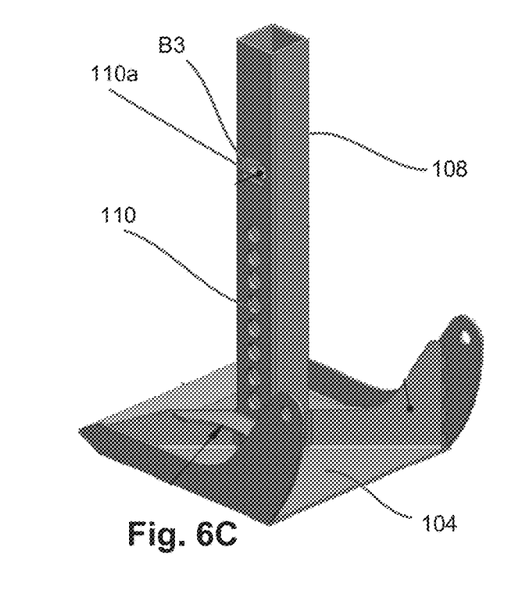
FIG. 6C is a perspective view of a first post of a trailer support safety stand according to certain embodiments of the present disclosure.

First post 108 may include one or more first openings 110, as particularly shown in FIGS. 5A-5B and 6C. In some embodiments, the one or more first openings 110 may be of a circular shape, e.g., each having a diameter of approximately 1.19 inches, and may be disposed along a length of the first post 108, such as in an evenly spaced orientation. In some embodiments, first post 108 may comprise eight identical first openings 110, wherein each first opening 110 is positioned such that approximately 1.75 inches are provided from center to center of each adjacent first opening 110. As shown in FIG. 4A, the one or more first openings 110 may be formed in a first wall 108A of the first post 108 and extend through a second wall 108B of the first post 108, the first and second walls 108A, 108B being opposite each other.

As shown in FIG. 6C, first post 108 may further include an opening 110a configured to house a bracket B3, which may be configured the same as or similar to bracket B1 as described above with respect to top plate 102 and further described below. In some embodiments, opening 110a may comprise a rectangular shape, and may be approximately 2.26 inches by 1.75 inches in size. As described above with respect to first openings 110, opening 110a may also be formed in the first wall 108A of the first post and extend through the second wall 108B of the first post 108.

As shown in FIGS. 5A-5B and 6B, the second post 112 of the post assembly 106 may include a second opening 114 that may also be of a circular shape, and may be of the same or similar size as the one or more first openings 110. As shown in FIG. 4A, the second opening 114 may be formed in a first wall 112A of the second post 112 and extend through a second wall 112B of the second post 112, the first and second walls 112A, 112B being opposite each other. The first post 108 and the second post 112 of post assembly 106 may be configured to telescope within each other, as described above, such that the one or more first openings 110 can align with the second opening 114, as shown in FIGS. 3D and 5A-5B. These features enable the height of post assembly 106 to be adjusted, as further described below. Further note that in other examples, one or more of the relationships and features of the first and second posts can be reversed. For example, it is contemplated that the second post can be telescoped within the first.

Figure 3A:
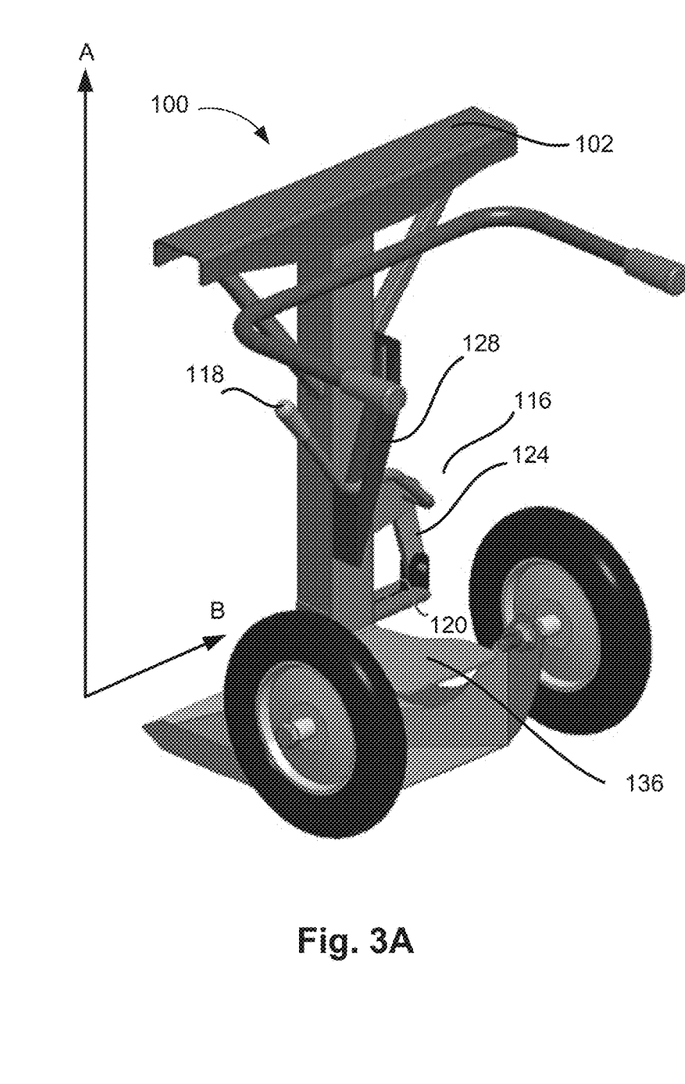
FIG. 3A is a rear right perspective view of a trailer support safety stand in an unlocked position according to certain embodiments of the present disclosure.
Figure 3B:
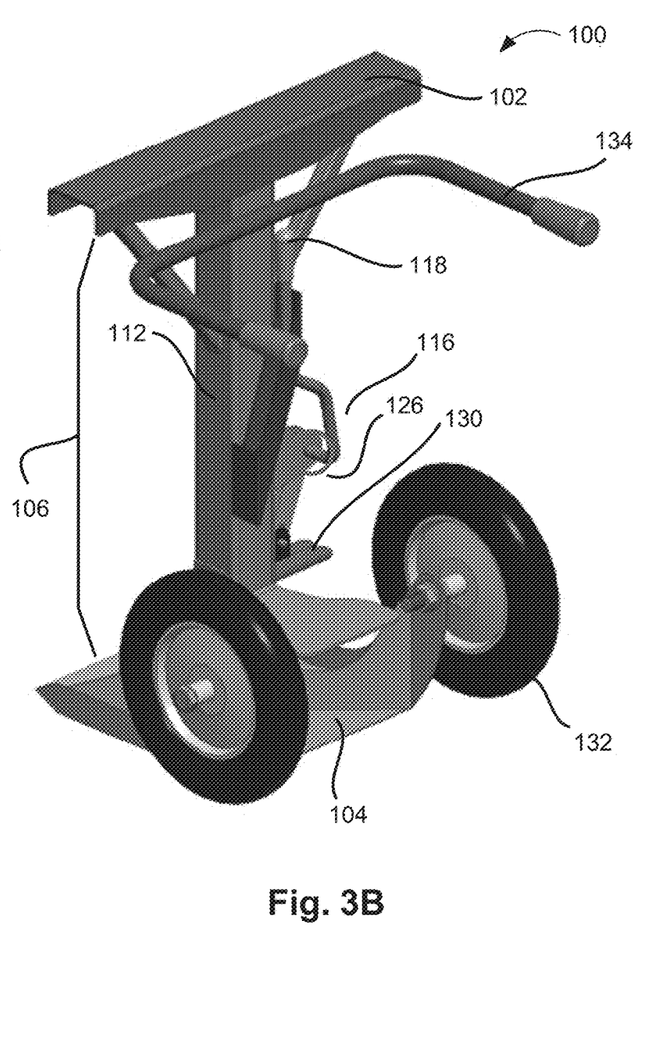
FIG. 3B is a rear right perspective view of a trailer support safety stand in a locked position according to certain embodiments of the present disclosure.

As particularly shown in FIGS. 3A-3B, stand 100 may further include a height adjustment mechanism 116 comprising a handle 118 and a locking device 120, such as a pin, disposed at an end of the handle 118. As particularly shown in FIG. 3E, handle 118 may include a bent configuration or be turned outward such that an operator may not knock or pinch his or her hand(s) or finger(s) on other components of stand 100, such as post assembly 106, when using stand 100 in operation.

Figure 6D:
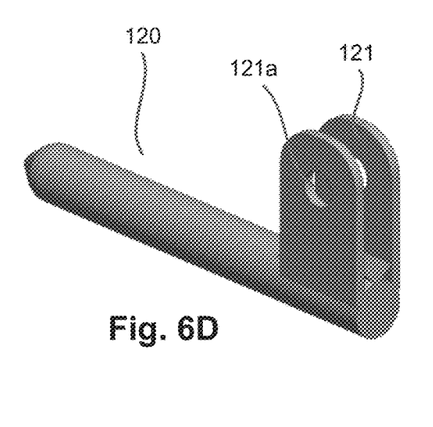
FIG. 6D is a perspective view of a locking device of a trailer support safety stand according to certain embodiments of the present disclosure.
Figure 6E:
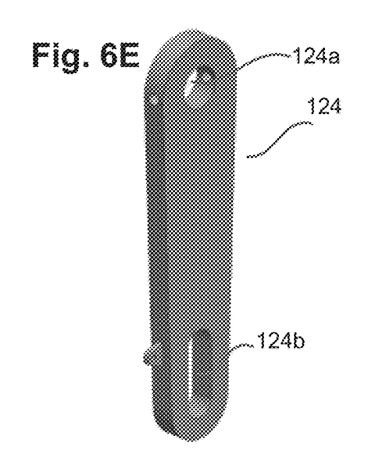
FIG. 6E is a perspective view of a linkage of a trailer support safety stand according to certain embodiments of the present disclosure.
Figure 6F:
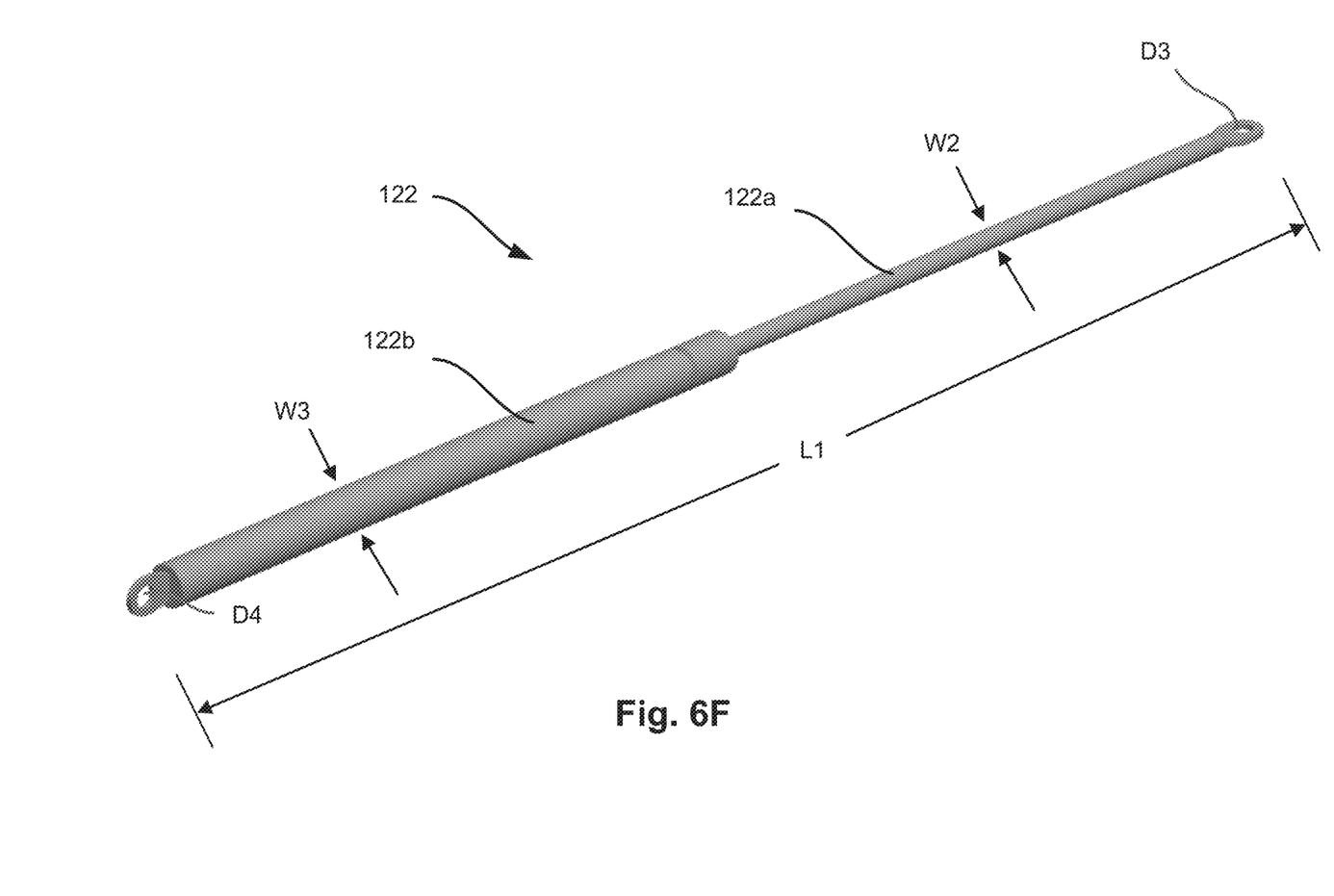
FIG. 6F is a perspective view of a gas spring of a trailer support safety stand according to certain embodiments of the present disclosure.

The height adjustment mechanism 116 may further include an internal mechanism 122, such as a piston or gas spring, for aiding in adjusting the height of the post assembly 106, as illustrated in FIG. 6F and further described below. The height adjustment mechanism 116 may be configured to adjust the height of the post assembly 106 such that when the handle 118 is moved toward the post assembly 106, the locking device 120 is inserted through the aligned first and second openings, and when the handle 118 is moved away from the post assembly 106, the locking device 120 is removed from the aligned first and second openings. In some embodiments, adjusting the height of post assembly 106 may include moving the handle 118 and the locking device 120 in the same direction. In other embodiments, adjusting the height of post assembly 106 may include moving the handle 118 and the locking device 120 in different directions, as further described below. Such movement configurations enable an operator to easily adjust the height of post assembly 106 without having to bend over or squat down to insert and remove locking device 120 from the aligned first and second openings.

As shown in FIG. 6F, the internal mechanism 122, such as a piston or gas spring, may include a first segment 122a and a second segment 122b that may be cylindrical in shape and configured to telescope within each other as the height of post assembly 106 is being adjusted, as described herein. First segment 122a may include a width W2 of approximately 0.39 inches, and a circular opening D3 having a diameter of approximately 0.38 inches. Opening D3 may be configured to connect to one or more components of stand 100, such as the top plate 102 via gas spring mounting bracket B1. Second segment 122b may include a width W3 of approximately 0.86 inches, and a circular opening D4 having a dimeter of approximately 0.44 inches. Opening D4 may be configured to connect to one or more components of stand 100, such as first post 108 via bracket B3. When extended, internal mechanism 122 may have a length L1 of approximately 28.13 inches.

Figure 3C:
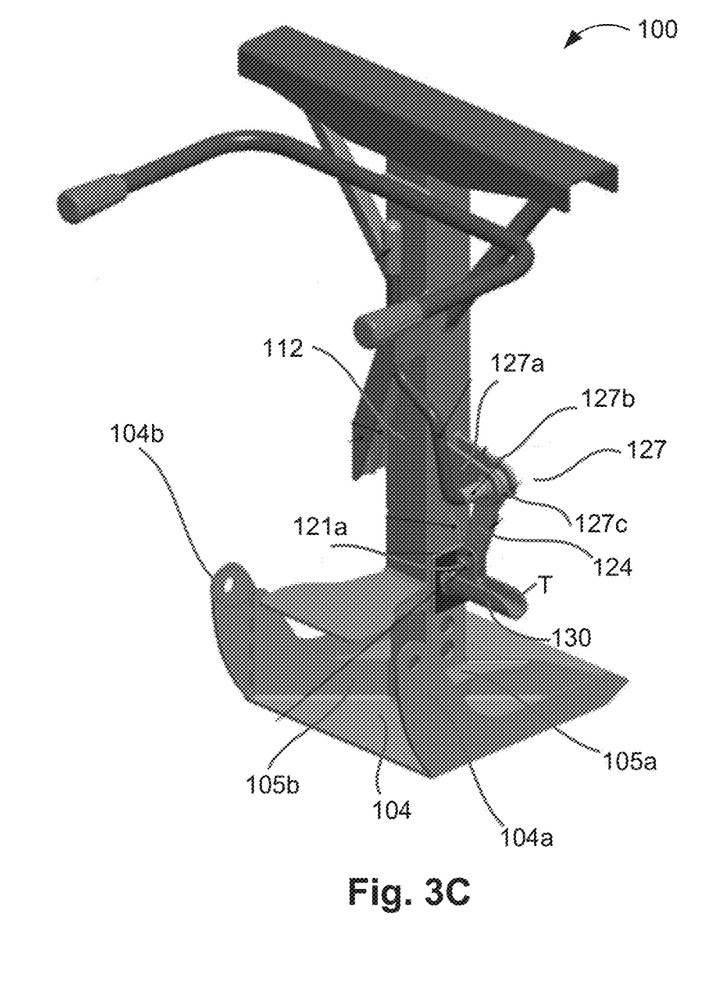
FIG. 3C is a rear left perspective view of a trailer support safety stand in a locked position according to certain embodiments of the present disclosure.
Figure 3D:
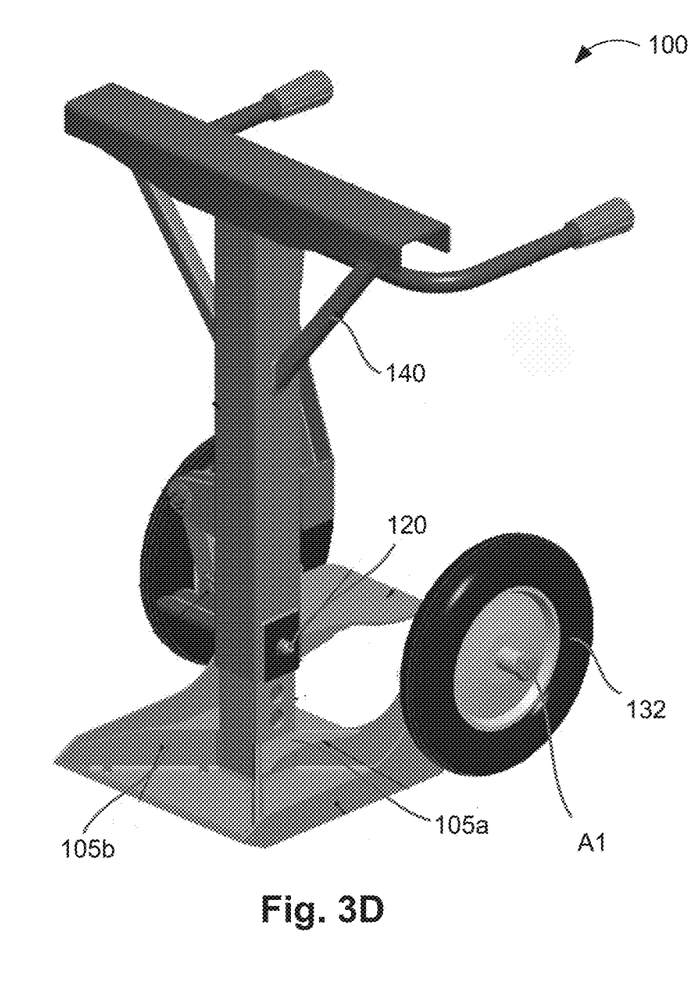
FIG. 3D is a front right perspective view of a trailer support safety stand in a locked position according to certain embodiments of the present disclosure.
Figure 3E:
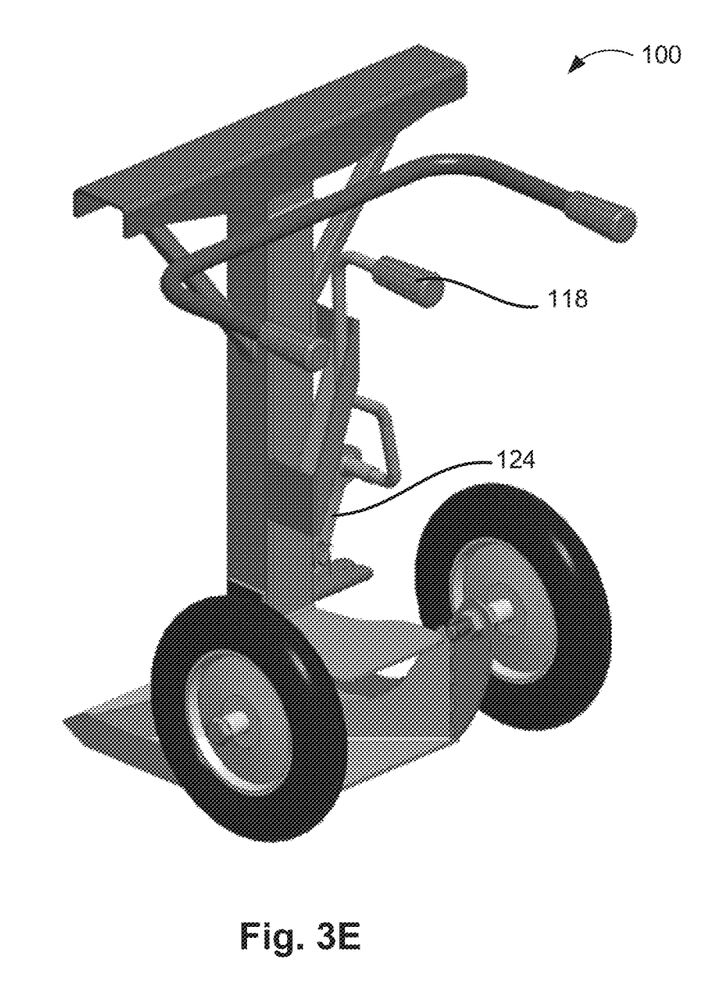
FIG. 3E is a rear right perspective view of a trailer support safety stand in an unlocked position according to certain embodiments of the present disclosure.
Figure 4B:
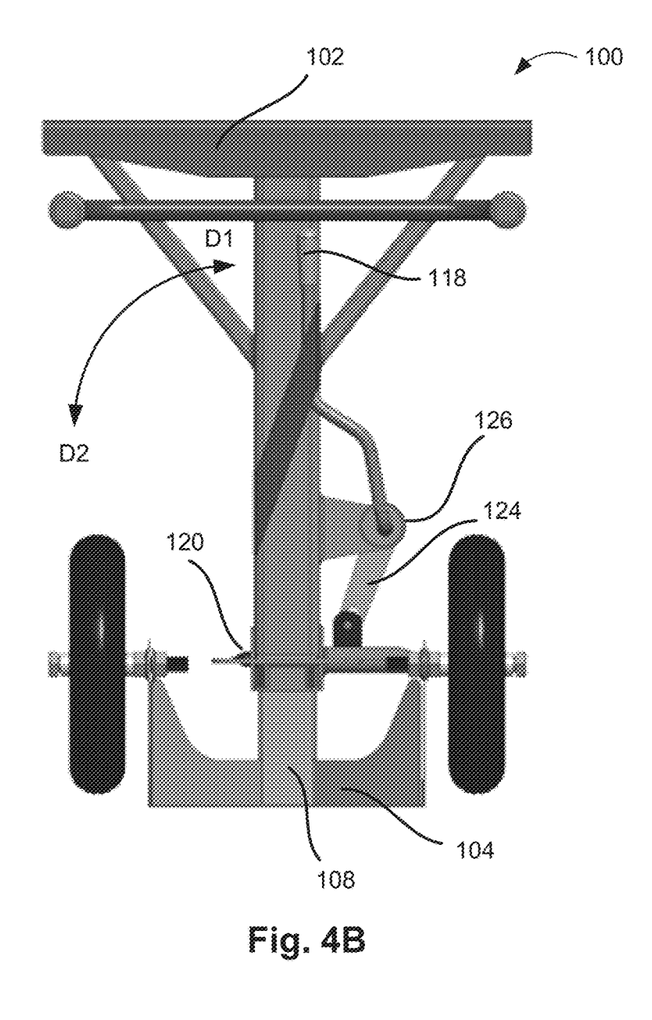
FIG. 4B is a rear view of a trailer support safety stand in a locked position according to certain embodiments of the present disclosure.

Locking device 120, as particularly shown in FIGS. 3D, 4B, and 6D, may comprise a load bearing component of stand 100, and as such, in operation should be inserted all the way through the aligned first and second openings to safely lock the height of post assembly 106 in place. That is, when locking device 120 is inserted through the aligned first and second openings, locking device 120 may be configured to pass through both the first wall 108A and second wall 108B of first post 108, and the first wall 112A and second wall 112B of second post 112, as particularly shown in FIG. 4A and described above, such that locking device 120 may help bear the load of the detached trailer portion resting on top plate 102. As particularly shown in FIGS. 4B and 6D, locking device 120 may comprise one or more attachment brackets 121 configured to removably attach to and engage with height adjustment mechanism 116 via one or more openings 121a. That is, one or more fasteners (e.g., cotton pin, washer, etc.) may be slid through openings 121a to attach locking device 120 to height adjustment mechanism 116, as further discussed below.

In some embodiments, as shown in FIGS. 3A-3B and 4A-4B, the height adjustment mechanism 116 may further include a linkage 124 configured to provide a pivot point 126 between the handle 118 and the locking device 120. In such embodiments, height adjustment mechanism 116 may be configured to adjust the height of post assembly 106 when the handle 118 is rotated around the pivot point 126, as further described below. The linkage 124 may be configured to attach to the handle 118 via one or more fasteners, such as a shoulder bolt, nylon lock nut, and the like. The pivot point 126, and as such, the connection between the linkage 124 and the handle 118, may be positioned within a support bracket 127 attached to the second post 112, as particularly shown in FIG. 3C. The support bracket 127 may be configured to extend outward from second post 112 to the center of the pivot point 126 by approximately 4.0 inches. The support bracket 127 may comprise a first bracket 127a, a second bracket 127b, and a sleeve 127c connecting the first and second brackets 127a, 127b. Handle 118 may be configured to slide through the sleeve 127c, while linkage 124 may be configured to rotatably attach to the sleeve 127c via opening 124a, as particularly shown in FIG. 6E. A distance between the first and second brackets 127a, 127b, and thereby a length of the sleeve 127c, may be approximately 2.63 inches.

As discussed above, and particularly shown in FIG. 6D, locking device 120 may comprise attachment brackets 121 configured to removably attach to and engage with height adjustment mechanism 116 via openings 121a. As shown in FIGS. 3C and 6D-6E, one or more fasteners may be slid through both openings 121a of locking device 120 and opening 124b of linkage 124 such that locking device 120 and linkage 124 may engage with and rotatably attach to each other as handle 118 is moved toward and away from post assembly 106. As shown in FIG. 6E, opening 124a may comprise a circular shape, and may be approximately 0.88 inches in diameter. Opening 124b may comprise a spherocylindrical shape configured such that openings 121a of locking device 120 and opening 124b of linkage 124 may freely engage with each other during operation of height adjustment mechanism 116.

As shown in FIGS. 3A and 4A, while the post assembly 106 may be disposed on a first plane A, the pivot point 126 may be disposed on a second plane B. In some embodiments, first and second planes A, B may be different, such as disposed 90 degrees relative to each other. In such embodiments where the height adjustment mechanism 116 includes the linkage 124 and the pivot point 126, moving the handle 118 toward the post assembly 106 may include rotating the handle 118 in a first direction D1 around the pivot point 126 (e.g., in a clockwise direction), while moving the handle 118 away from the post assembly 106 may include rotating the handle 118 in a second direction D2 around the pivot point 126 (e.g., in a counterclockwise direction), as particularly shown in FIGS. 4A-4B. As such, rotating handle 118 in the first direction D1 around pivot point 126 may insert or lock the locking device 120 through the aligned first and second openings, while rotating handle 118 in the second direction D2 around pivot point 126 may remove the locking device 120 from the aligned first and second openings.

In some embodiments, as shown in FIGS. 3A-3B and 4A-4B, the post assembly 106 may include an angular channel 128 configured to guide the handle 118 as it is moved toward and away from post assembly 106. That is, as the handle 118 is moved toward the post assembly 106, the handle 118 is moved in a first direction within the angular channel 128, and when the handle 118 is moved away from the post assembly 106, the handle 118 is moved in a second direction within the angular channel 128. In some embodiments, as particularly shown in FIG. 5B, the angular channel 128 may comprise a width W1, which may be approximately 1.28 inches.

In some embodiments, as particularly shown in FIGS. 3B and 3C, the post assembly 106 may include a channel 130 configured to guide the locking device 120 when being inserted through or removed from the aligned first and second openings. Channel 130 may comprise a U-shape channel, as particularly shown in FIG. 3C, with the height of the U-shape being approximately 1.63 inches, and an inner circular diameter of approximately 1.25 inches. Channel 130 may also comprise a tapered outer tip T. Angular channel 128 and channel 130 may respectively provide structural support for handle 118 and locking device 120, such that these components of stand 100 do not become damaged or extend outside of their respective intended ranges or planes of motion.

In some embodiments, the stand 100 may further include one or more wheels 132, which may be solid or inflatable. Stand 100 may further include one or more handles 134 configured to aid in tilting the stand 100 onto the one or more wheels 132 such that stand 100 may be more easily moved from one location to another. In some embodiments, stand 100 may further include a foot plate 136, e.g., disposed on the second post 112, configured to further aid in tilting stand 100 onto the one or more wheels 132. Foot plate 136 may also aid in adjusting the height of post assembly 106 in that an operator may stand on foot plate 136 to compress the internal mechanism 122 such that the second post 112 may be adjusted relative to the first post 108. That is, second post 112 may be moved upward and/or downward to align second opening 114 with a first opening 110 to either insert locking device 120 through the aligned openings to lock the height of post assembly 106 in place, or to remove locking device 120 from the aligned openings to adjust the height of post assembly 106. Once again, these features enable an operator to easily adjust the height of post assembly 106 without having to bend over or squat down to reach locking device 120.

In some embodiments, the stand 100 may further include one or more support struts 140, as particularly shown in FIG. 3D. Support struts 140 can be attached to one or more components of stand 100 to provide additional structural support to stand 100. While the embodiments disclosed herein illustrate two support struts 140, each disposed at an angle and connecting top plate 102 and second post 112, those having skill in the pertinent art will appreciate that support struts 140 may be provided in varying configurations and shapes, and may be connected to varying components of stand 100 to provide additional structural support to stand 100.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 99%.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A trailer support safety stand for supporting a detached trailer portion of a semi-trailer, the stand comprising:

a top plate configured to engage the detached trailer portion;

a base pad, opposite the top plate, and configured to engage the ground;

a post assembly comprising:
   a first post extending upwardly from the base pad, the first post comprising one or more first openings; and
   a second post extending downwardly from the top plate, the second post comprising a second opening, wherein the first post and the second post are configured to telescope within each other such that the one or more first openings can align with the second opening; and a height adjustment mechanism comprising:
   a handle having a first end and a second end;
   a locking device; and
   a linkage coupled to the second end of the handle and configured to provide a pivot point between the handle and the locking device;
   wherein the height adjustment mechanism is configured to adjust a height of the post assembly such that when the first end of the handle is rotated around the pivot point and toward the post assembly, the locking device is inserted through the aligned first and second openings, and
   wherein when the first end of the handle is rotated around the pivot point and away from the post assembly, the locking device is removed from the aligned first and second openings.

2. The stand of claim 1, wherein the post assembly is disposed on a first plane and the pivot point is disposed on a second plane, and wherein the first and second planes are different.

3. The stand of claim 2, wherein the first and second planes are disposed 90 degrees relative to each other.

4. The stand of claim 1, wherein the height adjustment mechanism further comprises a piston or spring.

5. The stand of claim 1, wherein the one or more first openings are disposed along a length of the first post.

6. The stand of claim 5, wherein the one or more first openings are formed in a first wall of the first post and extend through a second wall of the first post, and wherein the first wall and the second wall are opposite each other.

7. The stand of claim 1, wherein the post assembly further comprises an angular channel, wherein moving the handle toward the post assembly comprises moving the handle in a first direction within the angular channel, and wherein moving the handle away from the post assembly comprises moving the handle in a second direction within the angular channel.

8. The stand of claim 7, wherein the post assembly further comprises a channel configured to guide the locking device when inserted through or removed from the aligned first and second openings.

9. The stand of claim 1, further comprising one or more wheels, and one or more handles configured to aid in tilting the stand onto the one or more wheels.

10. The stand of claim 1, further comprising a foot plate configured to aid in adjusting the second post relative to the first post.

11. A trailer support safety stand for supporting a detached trailer portion of a semi-trailer, the stand comprising:

a top plate configured to engage the detached trailer portion;

a base pad, opposite the top plate, and configured to engage the ground;

a post assembly comprising:
   a first post extending upwardly from the base pad, the first post comprising one or more first openings; and
   a second post extending downwardly from the top plate, the second post comprising a second opening, wherein the first post and the second post are configured to telescope within each other such that the one or more first openings can align with the second opening; and a height adjustment mechanism comprising:
   a handle comprising a first end and a second end; and
   a locking device disposed at the second end of the handle;
   wherein the height adjustment mechanism is configured to adjust a height of the post assembly, such that when the first end the handle, opposite the second end, is moved toward the post assembly, the locking device is inserted through the aligned first and second openings, and
   wherein when the first end of the handle is moved away from the post assembly, the locking device is removed from the aligned first and second openings.

12. The stand of claim 11, wherein the height adjustment mechanism further comprises a piston or spring.

13. The stand of claim 11, wherein the one or more first openings are disposed along a length of the first post.

14. The stand of claim 13, wherein the one or more first openings are formed in a first wall of the first post and extend through a second wall of the first post, and wherein the first wall and the second wall are opposite each other.

15. The stand of claim 14, wherein the second opening is formed in a first wall of the second post and extends through a second wall of the second post, and wherein the first wall and the second wall are opposite each other.

16. The stand of claim 15, wherein the post assembly further comprises a channel configured to guide the locking device when inserted through or removed from the aligned first and second openings.

17. The stand of claim 11, further comprising:
   one or more wheels;
   one or more handles configured to aid in tilting the stand onto the one or more wheels; and
   a foot plate configured to aid in adjusting the second post relative to the first post.

18. The stand of claim 11, wherein adjusting the height of the post assembly comprises moving the handle and the locking device in a same direction.

19. The stand of claim 11, wherein the first end of the handle is a top end of the handle.

20. The stand of claim 1, wherein the first end of the handle is a top end of the handle.

* * * * *